United States Patent [19]
Kitamura

[11] 3,909,796
[45] Sept. 30, 1975

[54] INFORMATION RETRIEVAL SYSTEM SERIALLY COMPARING SEARCH QUESTION KEY WORDS IN RECIRCULATING REGISTERS WITH DATA ITEMS

[75] Inventor: Tetsuo Kitamura, Sagamihara, Japan

[73] Assignee: Ricoh Co., Ltd., Tokyo, Japan

[22] Filed: Sept. 21, 1973

[21] Appl. No.: 399,627

[30] Foreign Application Priority Data

Sept. 25, 1972 Japan .............................. 47-95942

[52] U.S. Cl. .............................................. 340/172.5
[51] Int. Cl.$^2$ .............................................. G06F 7/22
[58] Field of Search .................................. 340/172.5

[56] References Cited

UNITED STATES PATENTS

| | | | |
|---|---|---|---|
| 2,885,659 | 5/1959 | Spielberg | 340/172.5 |
| 3,191,006 | 6/1965 | Avakian | 340/172.5 X |
| 3,311,887 | 3/1967 | Muroga | 340/172.5 |
| 3,435,423 | 3/1969 | Fuller et al. | 340/172.5 |
| 3,456,243 | 7/1969 | Cass | 340/172.5 |
| 3,636,519 | 1/1972 | Heath | 340/172.5 |
| 3,648,254 | 3/1972 | Beausoleil | 340/172.5 |
| 3,662,348 | 5/1972 | Weiss | 340/172.5 |

*Primary Examiner*—Gareth D. Shaw
*Assistant Examiner*—Michael C. Sachs
*Attorney, Agent, or Firm*—Cooper, Dunham, Clark, Griffin & Moran

[57] ABSTRACT

Key words defining a search question are entered into circulating registers which circulate the key words in synchronism with data units read out serially from a storage device, each data unit consisting of a key word and codes for locating documents or bibliographies corresponding to said key word. The key words of the data units read out from the storage device are compared with the search question key words in the registers. The data unit whose key word coincide with search question key words are transmitted to a secondary information retrieval device such as a microfilm reader-printer so that the corresponding documents can be retrieved and displayed.

4 Claims, 3 Drawing Figures

INFORMATION RETRIEVAL SYSTEM SERIALLY COMPARING SEARCH QUESTION KEY WORDS IN RECIRCULATING REGISTERS WITH DATA ITEMS

BACKGROUND AND SUMMARY OF THE INVENTION

The present invention relates to an information retrieval system and more particularly a simplified information retrieval system adapted for primary retrieval of word indexed information.

Word indexing type information storage and retrieval systems have been widely used in various fields because they have many advantages. In the word indexing system, the machine can rapidly search for the codes identifying the location of documents or bibliographies corresponding to the search key words and thereafter retrieve such documents or bibliographies for display or print out. The step of searching for the codes for locating the pertinent documents is generally called the primary information retrieval while the step of physically retrieving the pertinent documents or bibliographies for display and/or print out is called the secondary information retrieval.

The word indexing type information retrieval system associated with a general purpose electronic computer may be used when a large body of information covered by various topics are stored and retrieved, but it is prohibitively expensive and particularly excessive time is required when only limited information is to be retrieved.

One of the objects of the present invention is therefore to provide a simplified information retrieval system best adapted for use when limited word indexed information in a limited field is stored and retrieved.

Another object of the present invention is to provide a simplified word indexing type information retrieval system very simple in construction.

According to one embodiment of the present invention there are provided circulating registers equal in number to the total number of seach question key words associated with all the documents or bibliographies stored in a secondary retrieval device. Each search question key word entered into a corresponding circulating register. A list of the key words (each associated with a code identifying the location of the corresponding document) is stored in a suitable storage device, and is read out in a bit serial manner to be compared with the key word or words stored in the circulating registers. When a search question key word coincides with a key words read out from the storage device, the key word and its code are transferred into the secondary information retrieval device.

The above and other objects, features and advantages of the present invention will become more apparent from the following description of one preferred embodiment thereof taken in conjunction with the accompanying drawing.

DESCRIPTION OF THE PREFERRED EMBODIMENT

Figure 1:
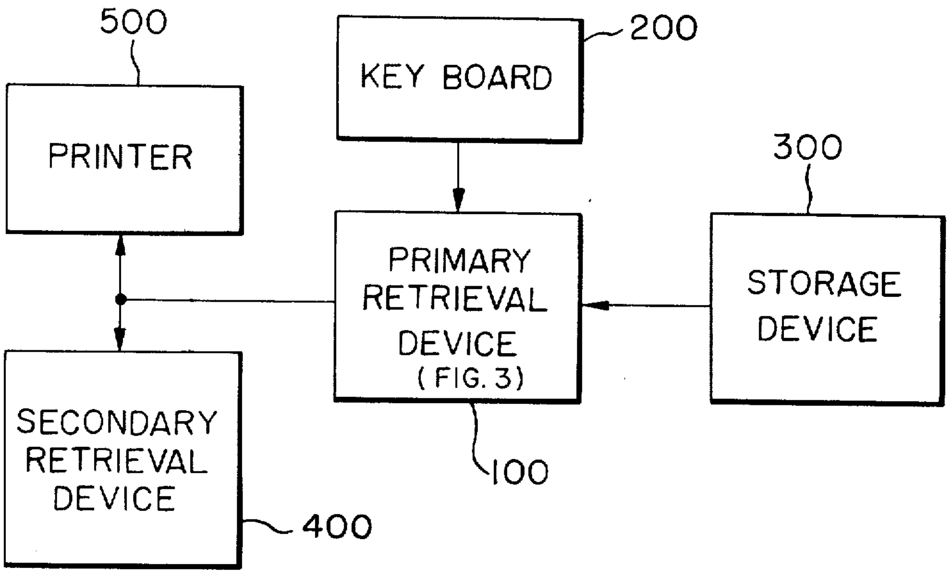
FIG. 1 is a block diagram of an information retrieval system in accordance with the present invention.

An information retrieval system of the present invention shown in FIG. 1 comprises a primary information retrieval device 100 (which — as described in detail below — is extremely simple in construction as compared with an electronic computer used in the conventional system), a keyboard 200 for entering the search criteria (search question key word or words) into the primary retrieval device 100, and a storage device 300 such as a magnetic disk or tape storage device for storing therein a list of key words and associated codes.

Figure 2:
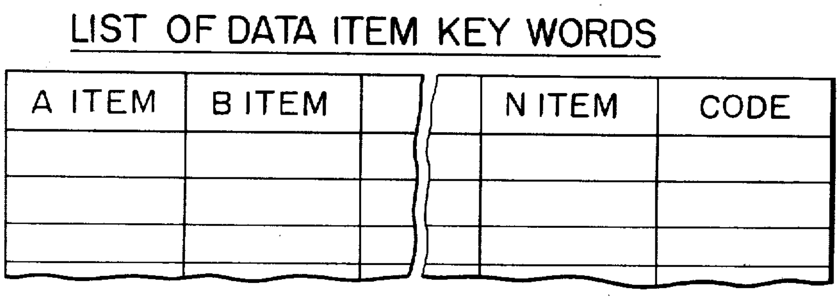
FIG. 2 is a view illustrating an example of a format of a list of key words.

An example of a format of key word lists stored in the storage device 300 for primary retrieval is shown in FIG. 2. The storage device 300 stores the list of key words including the codes for locating the bibliographies corresponding to the key words. The codes generally represent the ID numbers of microfilm cassettes stored in the microfilm reader-printer or of frames of the microfilms storing a body of information and will be referred to as "the file numbers" in this specification. The key word and its associated code for locating the corresponding documents bibliographies, that is the file numbers, will be referred to as "a data unit" in this specification.

Referring back to FIG. 1, the key words and their associated file numbers, that is the data units, are sequentially read out bit by bit from the storage device 300 and transferred into the primary retrieval device 100 where the key word or words are compared with the key word or words whose selection is entered into the primary retrieval device 100 by the keyboard 200. When they coincide with each other, the data unit or units are applied to a microfilm reader-printer 400 which is the secondary retrieval device, and to a printer. Then, the microfilm reader-printer physically retrieves the pertinent documents or bibliographies from the microfilms so as to display then on enlarged scale in the manner well known in the art, and, if necessary, said data unit or units are printed out by the printer 500. The keyboard 200, the storage device 300, the microfilm reader-printer 400 and the printer 500 are of the conventional type so that no detailed description thereof will be made in this specification.

Figure 3:
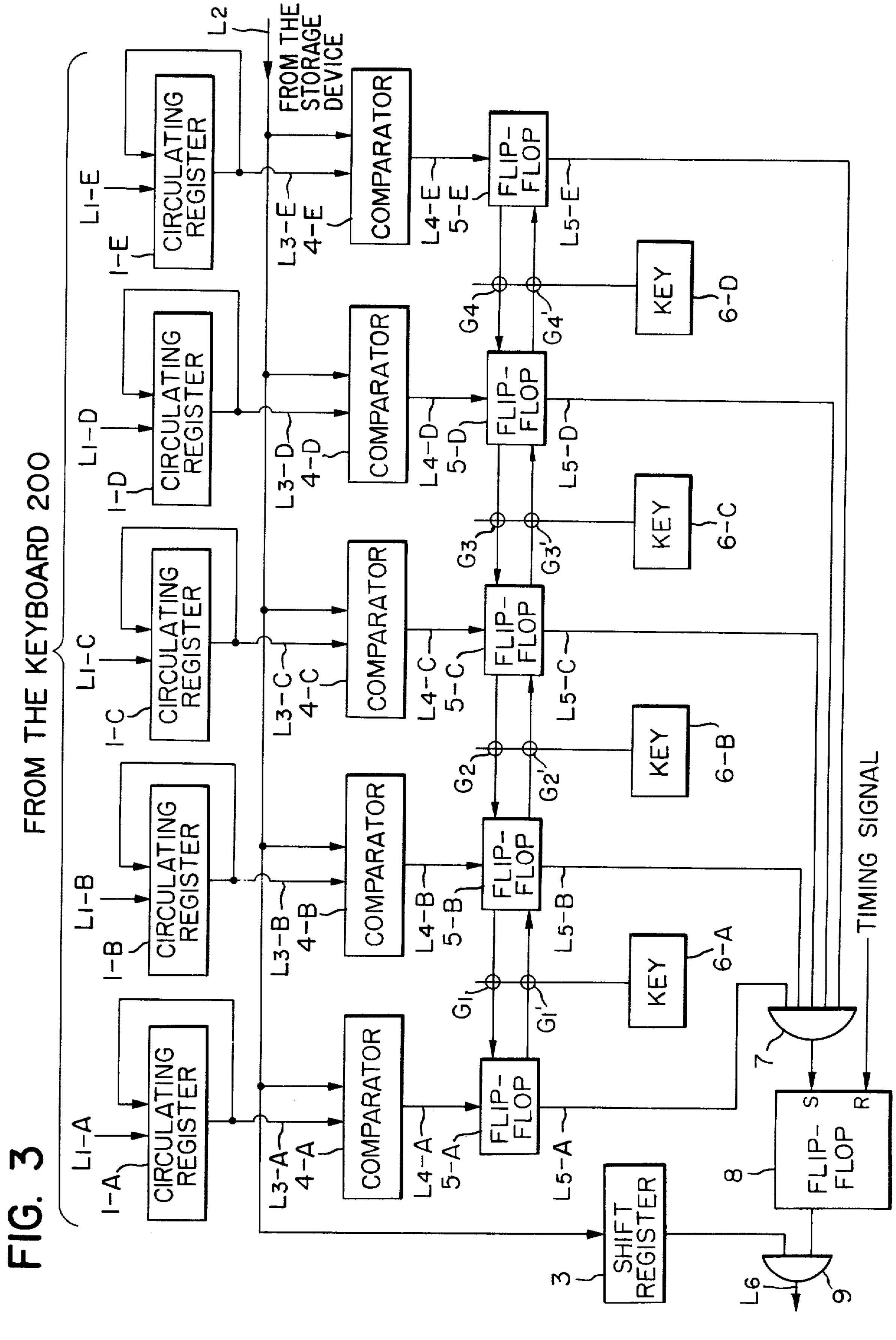
FIG. 3 is a block diagram of a primary information retrieval device in accordance with the present invention.

Next referring to FIG. 3 illustrating the primary data retrieval device 100, the key word items are arbitarily limited here to five A, B, C, D and E for the sake of simplicity. The search question key word or words are entered by the keyboard 200 into corresponding circulating registers 1-A, 1-B, 1-C, 1-D and 1-E through input lines $L_1$-A, $L_1$-B, $L_1$-C, $L_1$-D and $L_1$-E, and circulated through the registers. The data units are sequentially transmitted through a transmission line $L_2$ from the storage device 300 (See FIG. 1) into a shift register 3 capable of storing one data unit. In synchronism with the timing pulses for transmitting the data units sequentially from the storage device 300 to the shift register 3, the data stored in the circulating registers 1-A, 1-B, 1-C, 1-D and 1-E are circulated and they are also transferred through transmission lines $L_3$-A, $L_3$-B, $L_3$-C, $L_3$-D and $L_3$-E into comparators 4-A, 4-B, 4-C, 4-D and 4-E to which are also applied the data units from the transmission line $L_2$. In each of the comparators 4-A, 4-B, 4-C, 4-D and 4-E the corresponding search question key word is compared with each key word coming from the storage device 300. When the compared key words coincide with each other, the comparator generates a logic 1 signal which is transmitted through a corresponding transmission line $L_4$-A, $L_4$-B, $L_4$-C, $L_4$-D or $L_4$-E to a corresponding flip-flop 5-A, 5-B, 5-C, 5-D, or 5-E to set it. The flip-flops 5-A, 5-B, 5-C, 5-D and 5-E are intercommunicate through respective gates $G_1$, $G_2$, $G_3$, $G_4$, $G'_1$, $G'_3$ and $G'_4$. The gates $G_1$ and $G'_1$, through which the adjacent flip-flops 5-A and 5-B intercommunicate are coupled to a key 6-A so that they may be turned on and off upon depression of the key 6-A as will be described in more detail hereinafter. In like manner, the gates $G_2$ and $G'_2$, $G_3$ and $G'_3$, and $G_4$ and $G'_4$ are controlled by the keys 6-B, 6-C and 6-D, respectively. When all of the flip-flops 5-A, 5-B, 5-C, 5-D and 5-E are set into the state 1, the logic 1 signals are transmitted through transmission lines $L_5$-A, $L_5$-B, $L_5$-C, $L_5$-D and $L_5$-E to an AND gate 7 so that its output signal is applied to a flip-flop 8 to set it. The set signal of the flip-flop 8 is applied to an AND gate 9 so that the data unit stored in the shift register 3 is transmitted through the AND gate 9 and an output line $L_6$ to the microfilm reader-printer 400 and/or the printer 500 (See FIG. 1). Thus the primary retrieval is accomplished. When one data unit has been transmitted from the shift register 3, the flip-flop 8 is reset in response to a timing signal.

Next the mode of operation when only some of the search key question words are selected will be described. Assume, for example that only the key words A and C are selected. The operator depresses the keys 6-A, 6-B, 6-C and 6-D in such a way that the gates $G_1$, $G'_1$, $G_3$, $G'_3$, $G_4$ and $G'_4$ are turned on while the gates $G_2$ and $G'_2$ are turned off. When the comparators 4-A and 4-C give the output signals to the corresponding flip-flops 5-A and 5-B in a manner substantially similar to that described hereinbefore so that the flip-flops are set, the logic 1 signal of the flip-flop 5-A is applied through the gate $G'_1$ to the flip-flop 5-B. Therefore, the flip-flop 5-B is also set. In like manner, the set output signal of the flip-flop 5-C is applied to the flip-flop 5-D so that the latter is set. The set output signal of the flip-flop 5-D is applied to the flip-flop 5-E so that the latter is also set. Thus when the comparators 4-A and 4-C give the output signals to the corresponding flip-flops 5-A and 5-C, all of the flip-flops are set so that the data unit stored in the shift register 3 is transmitted through the output line of the microfilm reader-printer 400 and the printer 500 in a manner substantially similar to that described hereinbefore. The data unit may be also transmitted from the shift register 3 when the gates $G_1$ and $G'_1$ are opened while the remaining gates are closed. The flip-flop 5-B is set in response to the set output signal transmitted thereto through the gate $G_2$ from the flip-flop 5-C. In like manner only when the key word A is entered for questioning, all of the gates are turned on to cause the flip-flops 5-B, 5-C, 5-D and 5-E to set in response to the set output signal from the flip-flop 5-A.

In the instant embodiment, only five key words are shown, but it will be understood that the number of key words may be increased as needs demand. The logic equation representing that all of the key words A, B, C, . . . N are questioned is given by $$Y = ABC \ldots N \quad (1)$$

and the logic equation representing that only the key word A is questioned is given by $$Y = (A+B+C+\ldots N) \quad (2)$$

Therefore, the key word or words to be questioned may be expressed by a logic equation in which Eqs. (1) and (2) are combined.

It is to be understood that the preferred embodiment of the present invention hereindescribed is presented for the purpose of explanation and illustration and is not intended to indicate the limits of the invention and that various modifications can be effected without departing from the true spirit of the invention. For example gates may be inserted between the flip-flops 5-E and 5-A, and the output lines of the flip-flops may be interconnected through switching elements, which in turn are controlled in a suitable manner.

What is claimed is:

1. An information retrieval system comprising:

a plurality of recirculating registers for storing a corresponding plurality of key words representing retrieval search questions;

a corresponding plurality of comparators, each corresponding to a register;

a storage device for storing a plurality of data items each comprising at least one key word whose format is the same as that of the search question key words and an associated code identifying an associated document;

means for synchronously applying to each comparator the contents of the corresponding recirculating register and each of the key words of the data items in succession, from at least one of a plurality of data items from said storage device;

a plurality of flip-flops, each corresponding to one of said comparators;

means for setting each flip-flop upon coincidence of the key words applied to its corresponding comparator;

gate output means including register means for receiving the code of the data item whose key words have been compared with the contents of the recirculating registers and responsive to the coincidence of the set state of all flip-flops for gating out the received code; and means for selectively causing selected flip-flops to be set upon the setting of at least one other selected flip-flop, whereby said code may be gated out of the gate output means upon the coincidence of only one or more of said plurality of search question key words with a corresponding key word of a data item, said code word being available for use in locating an associated document.

2. An information retrieval system as in claim 1 wherein there are N flip-flops (N being an integer) arranged in a series and wherein the means for selectively causing selected flip-flops to be set upon the setting of other selected flip-flops comprises a plurality of gates connecting the set output of each of a plurality of selected flip-flops with the set inputs of each adjacent flip-flop of the series, and a keyboard having a plurality of keys, each key corresponding to the two gates between two adjacent flip-flops and each key manually settable to a first state in which it causes its corresponding gates to be turned on and a closed state in which it causes the last recited gates to be turned off.

3. An information retrieval system as in claim 2 wherein each of the comparators compares serially, bit-by-bit, the contents of the corresponding recirculating register with the data item key words from the storage device.

4. An information retrieval system as in claim 3, wherein the gate means comprises a gate for ANDing the set outputs of the flip-flops, a gate flip-flop which is set in response to an output from the last-recited gate, and an AND-gate for ANDing the set output of the gate flipflop with the code received in said register means.

* * * * *